United States Patent [19]
Aukeman et al.

[11] Patent Number: 5,152,251
[45] Date of Patent: Oct. 6, 1992

[54] ANIMAL BEDDING PRODUCT AND METHOD FOR MAKING SAME

[75] Inventors: Mark C. Aukeman, Columbus; Timothy J. Admonius, Kingston, both of Ohio

[73] Assignee: Horsefeathers Investment, Inc., St. Charles, Ill.

[21] Appl. No.: 403,995

[22] Filed: Sep. 7, 1989

Related U.S. Application Data

[63] Continuation of Ser. No. 108,220, Oct. 14, 1987, abandoned.

[51] Int. Cl.$^5$ .............................................. A01K 1/015
[52] U.S. Cl. ................................................... 119/171
[58] Field of Search .......................... 119/171, 172, 173

[56] References Cited

U.S. PATENT DOCUMENTS

| | | | |
|---|---|---|---|
| 1,967,333 | 7/1934 | Smith | 119/1 |
| 2,035,286 | 3/1936 | Wenzel | 71/9 |
| 2,179,591 | 11/1939 | Godchaux | 119/1 |
| 2,279,405 | 11/1939 | Laughlin | 119/1 |
| 2,442,492 | 6/1948 | Hassler et al. | 241/301 |
| 2,649,759 | 8/1953 | Gibbs | 119/1 |
| 2,708,418 | 5/1955 | Sugarman et al. | 119/1 |
| 3,093,524 | 6/1963 | Flamant | 154/43 |
| 3,256,857 | 6/1966 | Karras | 119/1 |
| 3,286,745 | 11/1966 | Meis | 144/178 |
| 3,304,970 | 2/1967 | Altosaar | 144/162 |
| 3,636,927 | 1/1972 | Baum | 119/1 |
| 3,913,643 | 10/1975 | Lambert | 144/172 |
| 4,038,944 | 8/1977 | Tucci | 119/1 |
| 4,519,340 | 5/1985 | Dickey | 119/1 |

FOREIGN PATENT DOCUMENTS

| | | |
|---|---|---|
| 0041456 | 12/1981 | European Pat. Off. . |
| 2511843 | 3/1983 | France .................................. 119/1 |

Primary Examiner—Robert P. Swiatek
Attorney, Agent, or Firm—Vorys, Sater, Seymour & Pease

[57] ABSTRACT

An improved animal bedding material, particularly suited for use with horses is formed substantially entirely from an aggregation of elongated woodshavings having substantially uniform parameters for improved performance. The length, width, thickness, and curl for each woodshaving forming the agglomerated plurality of such woodshavings is carefully controlled, so that the bedding product is free from sharp edges, fines, and slivers. Ranges for each of the controlled parameters are disclosed.

12 Claims, 1 Drawing Sheet

ANIMAL BEDDING PRODUCT AND METHOD FOR MAKING SAME

This application is a continuation of application Ser. No. 108,220, filed Oct. 14, 1987, now abandoned.

METHOD OF THE INVENTION

This invention relates to an improved product and process for making an animal bedding material, particularly suited for use with horses. More particularly, this invention relates to an animal bedding material formed from an assemblage or aggregation of elongated woodshavings having substantially uniform parameters for improved performance. Still more particularly, this invention relates to such a product wherein the length, width, curl, and thickness of a shaved wood product are precisely and consistently controlled within predetermined parameters for improved results.

The use of a number of different materials as animal bedding, and in particular, for horse bedding, has long been known to the art. Traditionally, horses and other animals have been bedded on straw placed in the stalls harboring the animals. Despite its ready availability, and its handling characteristics suitable for the use of a fork, as well as its disposability, straw has had significant shortcomings in moisture absorption, comfort for the animal, and other factors. The low moisture absorption of straw requires a more frequent stall cleaning.

As described in U.S. Pat. No. 1,967,333, various wood products such as sawdust and woodshavings have also been used as animal bedding. However, those materials have certain disadvantages because of their comparatively poor absorbency for semi-solid animal products. Sawdust, for example, tends to compact and agglomerate at its surface when wetted further impairing the absorbency of the material.

In addition, sawdust and woodshavings are often obtained from floor sweepings and sawmill waste products, and are thus not well suited for use for animals, and particularly, for show animals. Moreover, the density of sawdust inhibits its drying rate, so that undesirable wet spots form at the surface. Still further, sawdust is difficult to handle by a fork because of its particle size and configuration, its density, and its moisture absorption. Furthermore, sawdust contains a high percentage of fines, so it tends to be dusty and possibly harmful.

The use of woodshavings as animal bedding has sometimes proved satisfactory, but woodshavings also suffer some of the same shortcomings as sawdust in handling. If quality is uncontrolled, a high fine content and dust content exists. Moreover, woodshavings generally compact into a dense material having relatively few interstices for permitting animal moisture to trickle down through the bedding thu impairing its moisture absorbing capability. The ready availability of woodshavings from mill sources has been an advantage, but quality control of the woodshavings is a continuing problem in that the shavings may also possess sharp, potentially injurious edges, or splinters which may harm the bedded animal. In the case of show animals, and particularly show horses, woodshavings are thus not wholly acceptable.

Machines for producing woodshavings which have in the past been known for producing animal bedding are also known to the art as shown, for example, in U.S. Pat. No. 3,286,745 which is an improvement on the machine shown in U.S. Pat. No. 2,442,492. That machine utilizes a dual-cutter assembly to provide a consistency to the woodshavings. However, according to the disclosure of that machine, the woodshavings have an aspect ratio of length, as measured with the grain, to width as measured across the grain which visually is about one-to-one, with the chips varying in size from about $\frac{1}{8}$ of an inch to perhaps $\frac{3}{4}$ of an inch. Such a product made by that machine, often referred to in the art as a "Jackson mill", is currently available on the market and sold under the Trademark 'Stable Mate'. Another wood by-product which is more random in size, but having similar characteristics is currently available as a wood by-product marketed as a horse bedding material from a home interior molding manufacturer in Hillsboro, Ohio, and referred to as the "Hillsboro Woodshavings". Still further, a wood product from Canada distributed through a distributor in Ohio and referred to as "Cashman's Woodshavings" is known for use as horse bedding and those woodshavings are more dense and compact and contain a high percentage of fines and relatively small woodshavings. Finally, a bedding product made in Louisville, Kentucky is made from shredded coupons and paper and marketed as a premium horse bedding but which suffers a number of shortcomings is known by the name "Thorobed".

Thus, it is an overall aim of this invention to provide an animal bedding material, particularly suited for use with horses and other show animals, which is substantially uniform in size to facilitate its handling and to reduce sloppy stalls and wet spots, thereby extending the useful life of the bedding in the stall and reducing stall maintenance labor, while creating a healthy environment for horses.

It is also an objective of this invention to provide a substantially dust-free animal bedding material which is relatively free of slivers and fines and which efficiently dissipates moisture through absorption and evaporation.

It is a further aspect of this invention to provide a bedding material made from woodshavings with uniform, controlled parameters, in a substantially dust-free state, for use as an economically feasible bedding material.

These and other objectives of this invention will become apparent from a detailed description of the preferred embodiments, taken in conjunction with the accompanying drawings.

BRIEF SUMMARY OF THE INVENTION

Directed to achieving the foregoing general objectives of the invention, and overcoming problems associated with wood products previously used in connection with animal bedding, this invention relates to an improved animal bedding material, particularly suited for use with horses, made from wood with carefully controlled parameters provided on a consistent basis. In use, the invention comprises an assemblage or aggregation of a plurality of substantially uniformly-sized woodshavings having a controlled curl so that the agglomerative mass is comfortable for the animal, while providing a substantial moisture absorbing and releasing capability The parameters of the woodshaving, which are carefully controlled in accordance with the invention, are the length of the wood or cellulosic material, as measured with the grain; its width, as measured across the grain; its thickness, and the camber or curl for the woodshaving, as measured by the distance between a tangent to the arcuately-shaped shaving to an end of the shaving. According to the invention, the length is in a statistical range of ¾ to about 2 in.; the width is in a range of about 0.20 to about 0.375 in.; the thickness lies in a range of about 0.015 to about 0.030 in.; and the camber or curl is about ⅛ in. In a preferred embodiment, the length lies in a range of about 1.00 to about 2.00 in.; the width lies in a range of about 0.20 to about 0.375 in.; and the curl and the thickness of the shavings are about the same as in the disclosed embodiment. In the most preferred embodiment, the length is in a range of about 1.25 to about 2.00 in.; the width is at about 0.25 in.; the curl is about 0.125 in.; and the thickness is less than about 0.025 in.; with the material preferably being poplar. These controlled parameters, with their calculated aspect ratios, are set forth in Table A.

An agglomeration or assemblage of shavings having these parameters provides a substantially improved animal bedding product, particularly suited for horses, and is free from a substantial number of shortcomings described above.

Such a product is conveniently and economically prepared by using wood working machines known to the art, including the machine shown in U.S. Pat. No. 3,286,745, by modifying the cutters to produce shavings having the parameters noted above.

These and other features of the invention will become more apparent from a detailed description of the preferred embodiments taken in conjunction with the accompanying drawings.

DETAILED DESCRIPTION OF THE PREFERRED EMBODIMENTS

Figure 1:
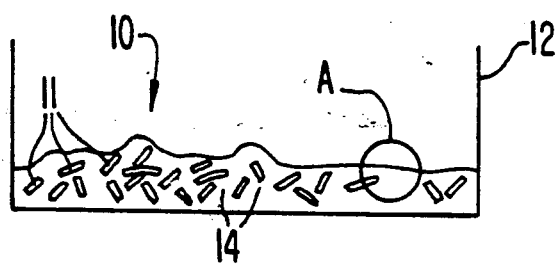
FIG. 1 is a cross-sectional diagrammatic view of animal bedding as it may be spread in a stall for a horse, for example, shown an agglomeration or assemblage of woodshavings having characteristics as described.
Figure 1A:
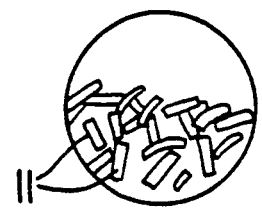
FIG. 1A shows an expanded segment of a portion of the assemblage shown in FIG. 1.

As shown in FIG. 1, a bedding product, made from an aggregation or assemblage of a plurality of woodshavings 11 controllably manufactured according to this invention and designated generally by reference numeral 10 is deposited in a stall, a portion of which is shown diagrammatically at the reference numeral 12. The size and shape of the woodshavings 11, as will hereinafter be described in detail, substantially reduces the density of the bedding product so that there are a substantial number of interstices 14 located between the individual woodshavings 11 making up the product 10, thus creating a significant amount of internal spacing. In use, the fibers are randomly oriented, as best seen in FIG. 1A, so that seepage of fluids into and, by wicking, throughout the aggregation 10 is possible, further assisting the absorption and ultimate dissipating evaporation of moistrire by the aggregation 10. The product 10 according to the invention, because of its low apparent density, i.e., to the weight of product per unit volume of product in an uncompacted state, makes handling for application and withdrawal of the product from the stall quite easy. Moreover, the random orientation of the product 10 permits turning and mixing of the product because of the presence of the bedded animal, further increasing its absorption characteristics, without causing a significant adverse compaction of the woodshavings 11 into a soggy, higher density mass which is more difficult to handle.

The aggregation 10 may be used as a bedding product in a conventional fashion for wide variety of animals. While its use as a bedding product for horses is preferably suggested, it may also be used for other animals, such as show cattle or zoo animals, in substantially the same way. As shown, the aggregation 10 presents virtually no sharp injurious surfaces to the animal and is substantially free of fines and slivers, thus reducing dust and opportunities of impregnation into the animal's tissue, or cutting or scratching of the skin of the animal or its handler.

Figure 2:
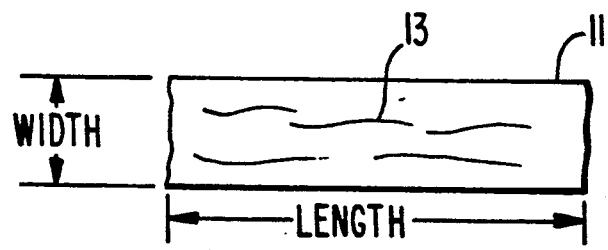
FIG. 2 shows a top plan view of a representative woodshaving forming the animal bedding and further illustrating its controlled length and width.
Figure 3:
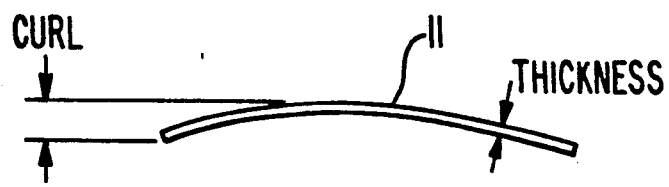
FIG. 3 is a side cross-sectional view of the woodshavings of FIG. 2 as used in the agglomeration shown in FIG. 1, illustrating the thickness and curl of the material.

The physical characteristics of each woodshaving 11 which makes up the aggregated product 10 are shown generally in FIGS. 2 and 3.

Table A, as an appendix to this application, recites the parameters of length, width, thickness, curl, and material for the woodshavings 11 as there shown according to this invention in a disclosed range, in a preferred range, and in a most preferred range. The Table includes a calculated aspect ratio for each woodshaving 11.

The length of the product, as measured with the wood grain 13, lies in a range of about 0.75 to about 2.00 in., and preferably in a range of about 1.00 to about 2.00 in. to produce a product having an aspect ratio in a range of about 2 to about 10. Thus, the woodshavings 11 are substantially longer than they are wide to produce a slight, but gentle and controllable curl in each shaving 11. Such a length aids in permitting easy handling by a fork as well as presenting a suitable area to moisture for absorption. In its most preferred range, the length of the fiber is between 1.250 and 2.00 in.

The width of each woodshaving 11, as measured across the grain 13, lies in a disclosed range of about 0.20 to about 0.375 in. and in a preferred range of 0.20 to 0.375 in., while the width of the most preferred embodiment is between about 0.15 in. and 0.30 in., optimally at 0.25 in.

The curl, as shown in FIG. 3, preferably lies in a disclosed range of less than about 0.125 inches, and is controlled by the cutting operation, taken in conjunction with the length and width of the product, and, to some extent, the physical characteristics of the wood. By controlling the curl of the product, substantial interleaving and interlinking of the product is avoided, reducing its tendency to agglomerate and compact thus making its handling more difficult.

The thickness is preferably on the order of about 0.015 to 0.030 in. While a number of wood or cellulosic materials can be used, non-toxic hard woods are preferred, and poplar is most preferred.

Poplar is most preferred due to its high moisture absorption, its wicking, its bright color, and its rapid rate of organic decomposition which facilitate its disposal. Poplar also retains its integrity when formed according to the invention, without significant fractor.

Furthermore, poplar is safe and non-toxic in contrast with certain other hardwoods such as black walnut and wild cherry. Other woods meeting these criteria are also most suitable for practicing the invention.

A characteristic of the invention is that the woodshavings 11 are constructed to have a substantially uniform size, shape, and texture. The shape and size of the particles is such that sharp edges are avoided, while the thickness provides a pliability and softness or gentleness for the product which is comfortable to the animal.

The product according to the invention may be made by modifying conventional woodworking equipment, such as a finishing machine available from Hitachi, to produce a wood particle having the size and characteristics noted. The machine shown in FIG. 3 of Meis U.S. Pat. No. 3,286,745 is hereby incorporated by reference as another machine suitable for producing the product according to the invention by modifying the tt blades to provide lternatively spaced serrations so that the width, length, and calbier of the curl may be controlled according to the invention.

It will clearly be understood by those skilled in the art that the foregoing description has been made in terms of the preferred embodiments and various changes and modifications may be made without departing from the scope of the present invention which is to be defined by the appended claims.

APPENDIX A

| | DISCLOSED RANGE | MOST PREFERRED | PREFERRED |
|---|---|---|---|
| Length (as measured with the wood grain) | about 0.75 in. to about 2.00 in. | about 1.00 in. to about 2.00 in. | about 1.25 in. to about 2.00 in. |
| Width (as measured cross the grain) | about 0.20 in. to about 0.375 in. | about 0.20 in. to about 0.375 in. | less than about 0.25 |
| Aspect Ratio | about 2 to 10 | about 2.66 to about 10 | about 5 to 8 |
| Camber or Curl | about ⅛ in. | same | same |
| Thickness | about 0.015 in. to about 0.030 in. | same | .025 in. |
| Material | natural wood or cellulosic material | non-toxic hardwood | poplar |

We claim:

1. An animal bedding material comprising an agglomeration of a plurality of woodshavings, each woodshaving having a length as measured with the grain of the woodshavings, a width as measured across the grain, a thickness, and a curl having preselected parameters, the length of each of said woodshavings being greater than its width.

2. The animal bedding as set forth in claim 1 wherein the length of each woodshaving comprising said agglomeration is in a range of about 0.75 in. to about 2.00 in., and its width is about 0.20 in. to about 0.375 in.

3. The animal bedding as set forth in claim 2 wherein a vertical rise of the curl of each woodshaving is less than about 0.125 in.

4. The animal bedding as set forth in claim 1, wherein the length of each woodshaving of said agglomeration is in a range of about 1.00 in. to about 2.00 in., while the width is in a range of about 0.2 in. to about 0.375 in.

5. The animal bedding as set forth in claim 4, wherein a vertical rise of the curl of each woodshaving is less than about 0.125 in.

6. The animal bedding as set forth in claim 1 wherein the length of each woodshaving comprising said agglomeration is in a range of about 1.25 in. to about 2.00 in., and its width is less than about 0.250 in.

7. The animal bedding as set forth in cliam 6, wherein each woodshaving is made from poplar.

8. The animal bedding as set forth in claim 1, wherein said agglomeration defines a plurality of interstices among said plurality of woodshavings to enhance moisture absorption.

9. The animal bedding as set forth in claim 1, wherein said agglomeration of said woodshavings is further characterized as being free from fines and slivers.

10. A method of making an animal bedding material comprising the steps of:
    forming a woodshaving from a source of wood having a length in a range of about 0.75 in. to about 1.00 in. and a width in the range of about 0.20 in. to about 0.375 in. with a thickness of less than about 0.03 in. to form a woodshaving having a culr with a vertical rise of less than about 0.125 in., each woodshaving being characterized as being substantially free from sharp edges; and
    forming a plurality of such woodshavings into a agglomeration for use as an animal bedding material.

11. The animal bedding as set forth in claim 10, wherein the step of forming is further characterized in that said length is in a range of about 1.00 in. to about 2.00 in. and said width is in a range of about 0.20 in. to about 0.375 in.

12. The method as set forth in claim 11, wherein said length is in a range of about 1.250 in. to about 2.00 in. and said width is less than about 0.25 in.

* * * * *